United States Patent [19]

Ovshinsky et al.

[11] 4,430,391
[45] Feb. 7, 1984

[54] FUEL CELL CATHODE

[75] Inventors: Stanford R. Ovshinsky, Bloomfield Hills; Krishna Sapru, Troy; Srinivasan Venkatesan, Royal Oak, all of Mich.

[73] Assignee: Energy Conversion Devices, Inc., Troy, Mich.

[21] Appl. No.: 399,891

[22] Filed: Jul. 19, 1982

[51] Int. Cl.$^3$ ............................................. H01M 4/90
[52] U.S. Cl. ....................................... 429/40; 429/44; 502/100; 502/300
[58] Field of Search .................... 429/40, 44; 252/471, 252/472

[56] References Cited

U.S. PATENT DOCUMENTS

| | | | |
|---|---|---|---|
| 3,496,021 | 2/1970 | Haefling | 429/40 |
| 3,528,857 | 9/1970 | Lieb et al. | 429/40 |
| 3,701,822 | 10/1972 | Negra et al. | 252/471 |
| 3,997,478 | 12/1976 | Petro | 252/471 |
| 4,076,899 | 2/1978 | Kring | 429/40 |
| 4,132,619 | 1/1979 | Klein et al. | 429/40 |

FOREIGN PATENT DOCUMENTS 56-4022  1/1981  Japan ..................................... 429/40

Primary Examiner—Donald L. Walton
Attorney, Agent, or Firm—Lawrence G. Norris

[57] ABSTRACT

A cathode for oxygen reduction in a fuel cell is formed from a host matrix including at least one transition metal element which is structurally modified by the incorporation of at least one modifier element to enhance its catalytic properties. The catalytic body is based on a disordered non-equilibrium material designed to have a high density of catalytically active sites, resistance to poisoning and long operating life. Modifier elements, such as La, Al, K, Cs, Na, Li, C, and O structurally modify the local chemical environments of a host matrix including one or more transition elements such as Mn, Co and Ni to form the catalytic materials of the cathode. The improved, low overvoltage, catalytic materials of the cathode of the present invention increase operating efficiencies of fuel cells employing such cathodes. The catalytic materials can be deposited as a layer on the surface of a porous electrode substrate to form a gas diffusion cathode or can be formed as a gas diffusion electrode.

40 Claims, No Drawings

FUEL CELL CATHODE

BACKGROUND OF THE INVENTION

The present invention relates generally to catalytic bodies and more specifically to catalytic bodies for use as cathodes in an alkaline fuel cell. The catalytic body of the invention is based on a disordered non-equilibrium material designed to have a high density of catalytically active sites, resistance to poisoning and long operating life.

A fuel cell is an electrochemical device in which the chemical energy of a conventional fuel is converted directly and efficiently into low voltage electrical energy. Fuel cells have many potential applications such as supplying power for transportation vehicles, replacing steam turbines and remote power supply applications.

Fuel cells, like conventional batteries, operate by utilizing electrochemical reactions. Unlike a battery, in which chemical energy is stored within the cell, fuel cells generally are supplied with reactants from outside the cell. Barring failure of the electrodes, as long as the fuel, preferably hydrogen, and oxidant, typically oxygen, are supplied and the reaction products are removed, the cell continues to operate.

Fuel cells also offer a number of important advantages over engine or generator systems. These include relatively high efficiency, environmentally clean operation especially when utilizing hydrogen as a fuel, high reliability, few moving parts, and quiet operation. Fuel cells potentially are more efficient than other conventional power sources based upon the Carnot cycle. As the world's oil supplies become depleted, hydrogen supplies remain quite abundant and offer a viable alternate source of energy. Hydrogen can be produced from coal or natural gas or can be produced without the use of fossil fuels, such as by the electrolysis of water using nuclear or solar energy.

The major components of a typical fuel cell are the anode for hydrogen oxidation and the cathode for oxygen reduction, both being positioned in a cell containing an electrolyte such as an alkaline electrolytic solution. Typically, the reactants such as hydrogen and oxygen, are respectively fed through a porous anode and cathode and brought into surface contact with the electrolytic solution. The particular materials utilized for the cathode and anode are important since they must act as efficient catalysts for the reactions taking place.

In an alkaline fuel cell, the reaction at the anode is between the hydrogen fuel and hydroxyl ions ($OH^-$) present in the electrolyte which react to form water and release electrons: $H_2 + 2OH^- \rightarrow 2H_2O + 2e^-$. At the cathode, the oxygen, water, and electrons react in the presence of the cathode catalyst to reduce the oxygen and form hydroxyl ions ($OH^-$): ($O_2 + 2H_2O + 4e^- \rightarrow 4OH^-$). The flow of electrons is utilized to provide electrical energy for a load externally connected to the anode and cathode.

Despite the above listed potential advantages, fuel cells have not been widely utilized. Contributing to the fuel cell's lack of widescale commercial acceptance has been the relatively high cost of operating the fuel cells. The most important factor contributing to the relatively high cost of producing energy from a fuel cell are the catalytic inefficiencies of the prior art catalytic materials used for the electrodes and/or the high costs of many of these materials. The catalytic inefficiencies of the materials add to the operating costs of the fuel cell since a lower electrical energy output for a given amount of fuel results. The use of expensive catalytic materials, such as noble metal catalysts, result in cells which are too expensive for widespread application.

The only alkaline fuel cells presently utilized are based upon noble metal catalysts and because of potential poisoning utilize ultrahigh purity fuels and electrolytes. These very expensive cells are only utilized for space applications where cost is not a factor. Virtually no commercial applications presently utilize alkaline fuel cells.

For example, one prior art fuel cell cathode catalyst is platinum. Platinum, despite its good catalytic properties, is not very suitable for widescale commercial use as a catalyst for fuel cell cathodes, because of its very high cost. Noble metal catalysts like platinum, also cannot withstand contamination by impurities normally contained in the hydrogen fuel and the electrolyte of the fuel cell. These impurities can include carbon monoxide which may be present in hydrogen fuel or contaminants contained in the electrolyte such as the impurities normally contained in untreated water including calcium, magnesium, iron, and copper.

The above contaminants can cause what is commonly referred to as a "poisoning" effect. Poisoning is where the catalytically active sites of the material become inactivated by poisonous species invariably contained in the fuel cell. Once the catalytically active sites are inactivated, they are no longer available for acting as catalysts for efficient oxygen reduction reaction at the cathode. The catalytic efficiency of the cathode therefore is reduced since the overall number of available catalytically active sites is significantly lowered by poisoning. The decrease in catalytic activity results in increased overvoltage at the cathode and hence the cell is much less efficient adding significantly to the operating costs. Overvoltage is the voltage required to overcome the resistance to the passage of current at the surface of the cathode (charge transfer resistance). The overvoltage represents an undersirable energy loss which adds to the operating costs of the fuel cell.

The reduction of the overvoltage at the cathode to lower operating cost of fuel cells has been the subject of much attention in the prior art. More specifically, the attention has been directed at the reduction of overvoltage caused by the charge transfer resistance at the surface of the cathode due to catalytic inefficiencies of the particular cathode materials utilized.

One prior art attempt to improve on the noble metal based catalysts was to use a spinel $NiCo_2O_4$ material. The spinel material can be prepared as a powder by freeze drying and by co-precipitation from a solution of mixed salts. Application of the catalytic material to the electrode substrate can be accomplished by using a binder mixed with the catalysts or by dipping the electrode substrate into a solution of mixed nitrate salts which is then dried and heated to decompose the nitrates and cured.

The shortcomings of spinel catalysts, as well as other prior cathode catalysts proposed in the prior art, is that these catalysts are generally based upon a crystalline structure. In a crystalline structure the catalytically active sites which provide the catalytic effect of such materials result primarily from accidently occurring, surface irregularities which interrupt the periodicity of the crystalline lattice. A few examples of such surface irregularities are dislocation sites, crystal steps, surface impurities and foreign adsorbates. A major problem with a crystalline structure is that the number of such irregularities forming the catalytically active sites are relatively few and occur only on the surface of the crystalline lattice. This results in the catalytic material having a density of catalytically active sites which is relatively low. Thus, the catalytic efficiency of the material is substantially less than that which would be possible if a greater number of catalytically active sites were available for the oxygen reduction reaction. Such catalytic inefficiencies result in a reduction in the fuel cell efficiency.

In summary, high catalytic efficiency from a relatively low cost material and resistance to poisoning in a fuel cell environment remain as desired results which must be attained before widescale commercial utilization of fuel cells is possible. Prior art fuel cell cathode catalysts, which have been generally predicated on either expensive noble metal catalysts or crystalline structures with a relatively low density of catalytically active sites, have not been able to meet the above requirements.

SUMMARY OF THE INVENTION

The disadvantages of the prior art which have prevented the wide scale use of fuel cells are overcome by greatly improving and expanding in a unique and fundamental way the characteristics of the oxygen reduction electrode by utilizing disordered non-equilibrium multi-component catalytic materials. The materials can be tailor-made to exhibit optimum catalytic activity for oxygen reduction by having a greater density of active sites, resistance to poisoning and long operating life.

The improved fuel cell cathodes are formed from non-equilibrium metastable highly disordered materials formed by modification techniques. The technique of modification to provide a non-equilibrium material having a high degree of disorder provides unique bonding configurations, orbital overlap and hence a spectrum of catalytically active sites for the oxygen reduction reaction. The modification technique involves tailoring of the local structural and chemical order of the materials of the present invention and is of great importance to achieve the desired characteristics. Amorphous materials having only short range order can be utilized as can crystalline materials having long range order, but where the structure is deliberately modified to increase the density of catalytically active sites above that obtainable in the prior art.

The improved catalytic activity of the present invention is accomplished by manipulating the local chemical order and hence the local structural order by the incorporation of selected modifier elements into a selected host matrix to create the desired disordered material. The disordered multicomponent materials may be amorphous, polycrystalline (but lacking long range order) or microcrystalline in structure, or an intimate mixture of amorphous and polycrystalline or microcrystalline phases.

The components of these materials include a host matrix including at least one transition element, and at least one modifier element introduced into the host matrix in a non-equilibrium manner. The incorporation of the modifier element or elements in this manner provides the desired disordered structure of the material and creates numerous local structural and chemical environments which act as catalytically active sites for the oxygen reduction reaction in a fuel cell. Co, Mn, and Ni are examples of transition elements particularly suitable for forming the host matrix and can also be utilized as modifier elements. Examples of the preferred modifier elements include La, Al, K, Li, Cs, Na, C, and O.

The catalytic materials of the present invention can be utilized for gas diffusion fuel cell cathodes utilizing conventional techniques and also by applying a thin layer of the catalytic material onto a previously formed gas diffusion electrode substrate. Vacuum deposition techniques, such as by cosputtering the host matrix and modifier elements, is a particularly suitable method of applying the catalytic materials for the gas diffusion cathodes.

DETAILED DESCRIPTION

The fuel cell of the present invention is based upon a unique approach to catalysis. This approach involves the design of non-equilibrium multicomponent disordered materials having tailor-made local structural chemical environments which yield excellent catalytic characteristics. The cathodes are designed to have a high density of active sites, resistance to poisoning and long operating life to provide efficient low cost fuel cell operation. The manipulation of local structural and chemical environments to provide catalytically active sites is made possible by utilization of a host matrix having at least one transition element. The matrix can, in accordance with the present invention, be modified with at least one other element to create a spectrum of bonding arrangements to provide a greatly increased density of catalytically active sites. With a greater density of catalytically active sites, the oxygen reduction reaction occurs much more readily to allow a more efficient oxygen reduction reaction in the fuel cell and hence reduce operating costs.

The increased number of catalytically active sites not only increases catalytic activity, but enables the materials to be more resistant to poisoning. This is because with materials of the present invention a certain number of catalytically active sites can be sacrificed to the effects of poisonous species while a large number of unpoisoned sites still remain to provide the desired catalysis for oxygen reduction. Also, some of the poisons are inactivated by being bonded to other sites without effecting the active sites.

The disordered materials of the present invention, unlike the specific and rigid structure of crystalline materials, are ideally suited for manipulation since they are not constrained by the symmetry of a crystalline lattice or by stoichiometry. By moving away from materials having restrictive crystalline symmetry, it is possible, by selectively modifying in accordance with the present invention, to accomplish a significant alteration of the local structural chemical environments involved in oxygen reduction to enhance the catalytic properties of the cathode materials. The disordered materials of the present invention can be modified in a substantially continuous range of varying percentages of modifier elements. This ability allows the host matrix to be manipulated by the modifier elements to tailor-make or engineer materials with characteristics suitable for catalysis of the oxygen reduction reaction of a fuel cell. This is in contrast to crystalline materials which generally have a very limited range of stoichiometry available and thus a continuous range of control of chemical and structural modification of such crystalline materials is not possible.

In the disordered materials of the present invention, it is possible to attain unusual electronic configurations resulting from nearest neighbor interactions between lone pairs, microvoids, dangling bonds, and unfilled or vacant orbitals. These unusual electronic configurations can interact with the modifier elements of the present invention which are incorporated into the host matrix to readily modify the local structural chemical order and thus the electronic configurations of the matrix to provide numerous catalytically active sites for oxygen reduction in a fuel cell.

The disorder of the modified material can be of an atomic nature in the form of compositional or configurational disorder provided throughout the bulk of the material or in numerous regions of the materials. The disorder can also be introduced into the material by creating microscopic phases within the material which mimic the compositional or configurational disorder at the atomic level by virtue of the relationship of one phase to another. For example, the disordered materials can be created by introducing microscopic regions of a different kind or kinds of crystalline phases, or introducing regions of an amorphous phase or phases in addition to regions of a crystalline phase or phases. The interfaces between these various phases can provide surfaces which are rich in local chemical environments providing numerous catalytically active sites.

A major advantage of the disordered materials of the present invention is that they can be tailor-made to provide a very high density and variety of catalytically active sites relative to materials based upon a crystalline structure. The types of structures which provide the local structural chemical environments for improved catalytic efficiency in accordance with the present invention include multicomponent polycrystalline materials lacking long range compositional order, microcrystalline materials, amorphous materials having one or more phases, or multiphase materials containing both amorphous and crystalline phases or mixtures thereof.

As discussed later in greater detail, modification of the host matrix element or elements to form the catalytic materials of the present invention can be accomplished by a variety of methods. One type of formation involves vacuum deposition techniques, (i.e., sputtering, vapor deposition or plasma deposition). With these techniques the catalytically active material of the present invention can be directly applied to the electrode surface. In these methods, the host matrix element or elements are co-deposited along with the modifier element or elements to form a layer of catalytic material on the surface of a substrate or preformed porous gas diffusion electrode.

MATERIAL PREPARATION

A number of materials were prepared by cosputtering and thereafter tested to illustrate the advantages of the disordered catalytic materials of the present invention. The materials referred to hereinafter were prepared and tested in general accordance with the following procedures except where indicated otherwise.

Cosputtering is a particularly suitable method for rapid screening or for forming the materials of the present invention. In forming the materials by cosputtering, the host matrix element or elements is co-deposited along with the modifier element or elements to form a layer of catalytic material on the surface of a substrate or preformed porous gas diffusion electrode. The cosputtering method enables the preparation of catalytic materials of the desired composition. Cosputtering is also desirable because it facilitates modification of the host matrix on an atomic scale, thus enabling tailor making of the material and also allowing for the formation of an intimate mixture of the material's component elements. Thus, the host matrix and modifier elements can be deposited in a non-equilibrium metastable manner to tailor-make the desired type and degree of disordered materials and create new local structural and chemical environments providing the desired catalytically active sites. Cosputtering also allows the application of a thin layer of catalytic material, such as 1 to 50 microns, which can be applied to a gas diffusion electrode used as a substrate, without affecting the gas diffusion operation of the porous substrate.

The catalytic layer may also initially include leachable components like aluminum or zinc which are subsequently partially leached out to leave a layer of a higher surface to volume ratio which increases catalytic activity and further modifies the catalytic material. The leachable components also can be removed in sufficient volume to ensure that the gas diffusion pores are not blocked when the materials are formed on gas diffusion electrodes used as a substrate.

The catalytic activity of the materials was first tested by codepositing the materials on any suitable conductive substrate, such as nickel or mild steel, prior to utilizing the materials as gas diffusion electrodes. The substrates were sandblasted to remove surface oxides and to roughen the surfaces to provide better adhesion for the later applied catalytic layer. The substrate was then placed in a vacuum chamber of a Mathis R.F. sputtering unit chamber, or in some instances a Sloan Magnetron 1800 Sputtering unit. The chamber was evacuated to a background pressure of $1 \times 10^{-6}$ torr. Argon gas was introduced into the chamber at a pressure of approximately $6.0 \times 10^{-3}$ torr. The Mathis sputtering target included a surface of sections of the elements desired to be included in the catalytic layer. The relative percentages of the elements contained in the deposited disordered materials were dependent upon the relative sizes of the sections of the target dedicated to the component elements and the positioning of the substrate relative to the target.

With the Sloan 1800 Magnetron sputtering unit, however, each element which was to be a component of the final catalytic layer had a separate target dedicated only to that element and the relative percentages of the component elements deposited in the catalytic layer were controlled by adjustment of the magnetic flux associated with each target as is well known by those skilled in this art. Regardless of whether the materials were produced utilizing the Mathis or Sloan Units, the substrate was maintained at a relatively low temperature, for example 50° C. to 150° C., to aid in the formation of the desired disordered structure. The thickness of the catalytic layers deposited on the substrate were on the order of ½ to 50 microns.

Some of the materials prepared had a component initially included therein and partially removed by leaching after formation of the cosputtered layers. The leaching of these materials was typically accomplished in a NaOH solution which was 17% by weight and at a temperature of 60° C. to 100° C. The duration of leaching was typically 1 to 4 hours.

Many of the materials were also subjected to a heat treatment at a temperature of in the approximate range of 250° C. to 400° C. preferably approximately 350° C. in an oxygen or air atmosphere for approximately one-half hour. The chemical composition of the catalytic layer was determined by energy dispersive spectroscopy or Auger spectroscopy. All chemical compositions stated in the following examples are given in atomic percentages.

The samples were tested in a half-cell utilizing an oxygen saturated 0.2 M NaOH solution as the electrolyte at room temperature. In some instances gas diffusion cathodes were used with a layer of catalytic material sputtered thereon. In testing those materials the oxygen was supplied through the cathode as is customary in gas diffusion fuel cell cathodes.

The technique of cyclic voltammetry in an oxygen saturated solution was used for evaluation of catalytic activity. Such testing provides a fast screening technique for thin film electrodes deposited on planar substrates and is particularly useful when comparative performance analysis is desired. Two criteria were used to evaluate the performance of the electrodes. One criterion was the half-wave potential (E ½) which is the potential at which one-half the peak current is obtained. The second criterion was the net current density at a given potential. The next current density due to the catalytic material was determined by subtracting the value of the current density of the cathode when operated in a deoxygenated solution from the current density value in an oxygen saturated solution. The current densities were calculated using the geometric surface area of the cathodes tested. For gas diffusion electrodes, the second criteria, current density was utilized to test the performance.

TABLE I

Oxygen Reduction Results of Representative Screened Materials Formed by Cosputtering

| Material Composition By % At. Wt. | Net Current Density $\mu A/cm^2$ (−.25V) | E ½ (V) |
|---|---|---|
| $Mn_{86.7}Co_{13.3}$ | 890 | −.09 |
| $Mn_{78.2}Co_{21.8}$ | 840 | −.10 |
| $Mn_{77.5}Co_{14.2}Ni_{8.3}$ | 1500 | −.105 |
| $Mn_{74.1}Co_{16.0}Ni_{9.9}$ | 1375 | −.115 |
| $Mn_{64.5}Co_{21.2}Ni_{14.4}$ | 1338 | −.135 |

Some representative results of Mn host matrices modified with Co or Co and Ni are illustrated in Table I. Mn alone tested under similar conditions was substantially worse than Ni or Co alone which are respectively, −0.23 V and 135 $\mu a/cm^2$ and −0.35 V and 200 $\mu A/cm^2$. Platinum references gave results of −0.07 to −0.08 V and 2850 $\mu A/cm^2$ (−0.11 V). The modified Mn host materials were thus substantially better than any of the components alone and approached the results of platinum. These materials are stable and do not degrade, while platinum degrades very quickly unless utilized in an ultraclean environment.

TABLE II

Oxygen Reduction Results of Representative Screened Materials Formed by Cosputtering

| Material Composition By % At. Wt. | Net Current Density $\mu A/cm^2$ (−.25V) | E ½ (V) |
|---|---|---|
| $Co_{89.7}Al_{10.3}$ | 1350 | −.11 |
| $Co_{77}La_{14}C_5O_4$ | 1325 | −.115 |
| $Co_{67.1}La_{13.6}C_{3.9}O_{15.4}$ | 1300 | −.115 |
| $Co_{54.8}Ni_{45.2}$ | 170 | −.17 |

Some representative results of Co host matrices modified with various elements are illustrated in Table II. These materials also exhibited significantly better results than the individual components and approached those of platinum.

TABLE III

Oxygen Reduction Results of Representative Screened Materials Formed by Cosputtering

| Material Composition By % At. Wt. | Net Current Density $\mu A/cm^2$ (−.25V) | E ½ (V) |
|---|---|---|
| $Ni_{65.9}Co_{20.7}Mn_{13.4}$ | 750 (−.15V) | −.14 |
| $Ni_{58.3}Mn_{22.4}Co_{19.3}$ | 1175 | −.13 |
| $Ni_{52.6}Co_{24.4}Mn_{23.0}$ | 1200 | −.135 |

Some representative results of Ni host matrices modified with Co and Mn are illustrated in Table III. These results are also significantly better than those of the constituent elements alone.

TABLE IV

Oxygen Reduction Results of Representative Materials Formed as Gas Diffusion Electrodes

| Material Composition By % At. Wt. | Net Current Density $mA/cm^2$ (20° C.) | Net Current Density $mA/cm^2$ (70° C.) |
|---|---|---|
| $Co_{89.7}Al_{10.3}$ | 95 | |
| $Co_{87.3}Mn_{12.7}$ | 100 | |
| $Co_{61.3}Ni_{30.4}Mn_{8.3}$ | 91 | 140 |
| $Co_{50.6}Ni_{42.1}Mn_{7.3}$ | 76 | |
| $Co_{44.8}Mn_{33.6}Ni_{21.6}$ | 81 | |
| $Mn_{85.3}Co_{10.2}Ni_{4.5}$ | 77 | 129 |
| $Mn_{73}Co_{18}Ni_9$ | 80 | |
| $Mn_{64.5}Co_{21.1}Ni_{14.3}$ | 96 | 134 |

Catalytic materials were also formed by cosputtering a thin layer of the material on the outer surface of a previously formed gas diffusion electrode. In one group of gas diffusion electrodes the layer of catalytic material was formed through the reactive cosputtering of Mn, Co and Ni in an oxygen environment. The cathodes were operated in the test cell by feeding oxygen gas from the back side of the cathode to the outer surface for oxygen reduction.

Some representative results of the disordered materials utilized as gas diffusion electrodes are illustrated in Table IV. The electrodes were tested for current density, since it is well known that it is not practical to measure E ½. These results are significantly better than those of the platinum test electrodes which gave 54 to 64 $mA/cm^2$ at −0.25 V. The carbon based porous gas diffusion substrate gave 43 $mA/cm^2$ by itself, but none of the test cathodes changed significantly with temperature. The modified materials showed significant increases in current density with an increase in temperature.

The modified materials showed excellent fuel cell catalytic characteristics, with good E ½ and current density values. Other modifier elements can be utilized in a like manner as those described above and can include K, Cs, Na and Li. Further, it should be noted that current density is related to surface area and can be manipulated by increasing the area and by controlling deposition parameters. For example, two modified materials were sputtered upon relatively porous graphite planar substrates resulting in very high current densities. ($Mn_{47.2}Co_{29.4}Ni_{23.4}$ and $Mn_{68.4}Co_{18.3}Ni_{13.3}$ with current densities of 9500 and 7250 $\mu A/cm^2$, respectively.)

While the present invention has been described in conjunction with specific embodiments, those of normal skill in the art will appreciate that numerous modifications and variations can be made without departing from the scope of the present invention, and such modifications and variations are envisioned to be within the scope of the appended claims.

We claim:
1. A fuel cell comprising:
    at least one cathode means for efficient oxygen reduction, said cathode means being formed from a disordered multicomponent material, said cathode means including a host matrix having at least one transition element and incorporating at least one modifier element;
    a casing having said cathode means positioned therein;
    at least one anode capable of hydrogen oxidation positioned within said casing and spaced from said cathode means; and
    an electrolyte in contact with both said anode and said cathode means.
2. The fuel cell as defined in claim 1 wherein said cathode means include means designed to include a plurality of chemical elements for providing a large number of catalytically active sites.
3. The fuel cell as defined in claim 1 wherein said cathode means include means designed to provide local chemical environments which include sites for selectively inactivating poisonous species.
4. The fuel cell as defined in claim 1 wherein said cathode means include means for reducing oxygen at low overvoltages.
5. The fuel cell as defined in claim 1 wherein said disordered material includes a designed internal porosity to enhance the oxygen reduction characteristics.
6. The fuel cell as defined in claim 1 wherein said material has non-equilibrium metastable phases and configurations.
7. The fuel cell as defined in claim 1 wherein said disordered material is a substantially polycrystalline multicomponent material lacking long range compositional order.
8. The fuel cell as defined in claim 1 wherein said disordered material is a substantially microcrystalline material.
9. The fuel cell as defined in claim 1 wherein said disordered material is a mixture of polycrystalline or microcrystalline phase regions and amorphous phase regions.
10. The fuel cell as defined in claim 1 wherein said disordered material is an amorphous material containing at least one amorphous phase.
11. The fuel cell as defined in claim 1 wherein said disordered material is a mixture of microcrystalline and polycrystalline phases.
12. The fuel cell as defined in claim 1 wherein said material is formed by cosputtering.
13. The fuel cell as defined in claim 1 wherein said cathode means include a porous gas diffusion substrate and said material is deposited as a layer on said substrate.
14. The fuel cell as defined in claim 1 wherein said material is heat treated at a temperature in the range of approximately 250° C. to 400° C.
15. The fuel cell as defined in claim 1 wherein said host matrix includes at least one element selected from the group consisiting of Co, Mn and Ni.
16. The fuel cell as defined in claim 1 wherein said modifier element is a transition element.
17. The fuel cell as defined in claim 1 wherein said modifier element is selected from the group consisting of Co, Mn, Ni, La, C, K, Cs, Na, Li, O and Al.
18. The fuel cell as defined in claim 1 wherein said material is heat treated in a oxygen containing atmosphere.
19. The fuel cell as defined in claim 1 wherein said modifier element is aluminum which is at least partially selectively removed from said material to further structurally modify said material, increase the catalytic activity of said material and form a porous material.
20. The fuel cell as defined in claim 1 wherein said cathode means include means for increasing the current density at temperatures above ambient temperature.
21. A fuel cell cathode comprising:
    a multicomponent compositionally disordered catalytic material including a host matrix having at least one transition element and having incorporated therein one or more modifier elements, said modifier element modifying the local structural chemical environments of said material to provide said disorder, said material including means creating an increased density of catalytically active sites for the oxygen reduction reaction.
22. The cathode as defined in claim 21 wherein said means include a plurality of chemical elements for providing a large number of catalytically active sites.
23. The cathode as defined in claim 21 wherein said means include means designed to provide local chemical environments which include sites for selectively inactivating poisonous species.
24. The cathode as defined in claim 21 wherein said means include means for reducing oxygen at low overvoltages.
25. The cathode as defined in claim 21 wherein said disordered material includes a designed internal porosity to enhance the oxygen reduction characteristics.
26. The cathode as defined in claim 21 wherein said means has non-equilibrium metastable phases and configurations.
27. The cathode as defined in claim 21 wherein said disordered material is a substantially polycrystalline multicomponent material lacking long range compositional order.
28. The cathode as defined in claim 21 wherein said disordered material is a substantially microcrystalline material.
29. The cathode as defined in claim 21 wherein said disordered material is a mixture of polycrystalline or microcrystalline phase regions and amorphous phase regions.
30. The cathode as defined in claim 31 wherein said disordered material is an amorphous material containing at least one amorphous phase.
31. The cathode as defiined in claim 21 wherein said disordered material is a mixture of microcrystalline and polycrystalline phases.

32. The cathode as defined in claim 21 wherein said material is formed by cosputtering.

33. The cathode as defined in claim 21 wherein said means include a porous gas diffusion substrate and said material is deposited as a layer on said substrate.

34. The cathode as defined in claim 21 wherein said material is heat treated at a temperature in the range of approximately 250° C. to 400° C.

35. The cathode as defined in claim 21 wherein said host matrix includes at least one element selected from the group consisting of Co, Mn and Ni.

36. The cathode as defined in claim 21 wherein said modifier element is a transition element.

37. The cathode as defined in claim 21 wherein said modifier element is selected from the group consisting of Co, Mn, Ni, La, C, K, Cs, Na, Li, Ni, O and Al.

38. The cathode as defined in clam 21 wherein said catalytic material is heat treated in an oxygen containing atmosphere.

39. The cathode as defined in claim 21 wherein said modifier element is aluminum which is at least partially selectively removed from said material to further structurally modify said material, increase the catalytic activity of said material and form a porous material.

40. The cathode as defined in claim 21 wherein said means include means for increasing the current density at temperatures above ambient temperature.

* * * * *

UNITED STATES PATENT AND TRADEMARK OFFICE
CERTIFICATE OF CORRECTION

PATENT NO. : 4,430,391

DATED : February 7, 1984

INVENTOR(S) : Ovshinsky, et al

It is certified that error appears in the above-identified patent and that said Letters Patent is hereby corrected as shown below:

Column 6, line 37, delete "evacuted" and insert --evacuated--.

Column 7, line 28, delete "next" and insert --net--.

Column 7, line 67 (Table II), delete "$Co_{77}La_{14}C5O_4$" and insert --$Co_{77}La_{14}C_5O_4$--.

Column 8, line 40 (Table IV), delete "$Mn_{64.5}Co_{21.1}Ni_{14.3}$" and insert --$Mn_{64.5}Co_{21.2}Ni_{14.3}$--.

Signed and Sealed this

Fifteenth Day of October 1985

[SEAL]

Attest:

Attesting Officer

DONALD J. QUIGG

Commissioner of Patents and Trademarks—Designate